United States Patent
Kim et al.

(10) Patent No.: US 7,567,304 B2
(45) Date of Patent: Jul. 28, 2009

(54) METHOD OF SHARING PREFERENCE CHANNEL IN DIGITAL BROADCASTING RECEPTION TERMINAL

(75) Inventors: Joo-Sub Kim, Gum-si (KR); Bum-Soo Kim, Daegu (KR)

(73) Assignee: Samsung Electronics Co., Ltd (KR)

( * ) Notice: Subject to any disclaimer, the term of this patent is extended or adjusted under 35 U.S.C. 154(b) by 717 days.

(21) Appl. No.: 11/347,936

(22) Filed: Feb. 6, 2006

(65) Prior Publication Data

US 2007/0094682 A1    Apr. 26, 2007

(30) Foreign Application Priority Data

Oct. 24, 2005    (KR) ................... 10-2005-0100303

(51) Int. Cl.
*H04N 5/445*    (2006.01)
(52) U.S. Cl. ..................... 348/725; 725/62

(58) Field of Classification Search ............. None
See application file for complete search history.

(56) References Cited

U.S. PATENT DOCUMENTS

| | | | |
|---|---|---|---|
| 2003/0163817 A1* | 8/2003 | Han | 725/46 |
| 2004/0221306 A1* | 11/2004 | Noh | 725/44 |
| 2006/0095938 A1* | 5/2006 | Joo | 725/46 |
| 2007/0033620 A1* | 2/2007 | Kim et al. | 725/62 |

* cited by examiner

*Primary Examiner*—Paulos M Natnael
(74) *Attorney, Agent, or Firm*—The Farrell Law Firm, LLP

(57) ABSTRACT

A method of sharing a preference channel in a digital broadcasting reception terminal includes registering a phone book group to which at least one preference channel and information on the preference channel are transmitted; if digital broadcasting data of the registered preference channel is received, detecting information on the preference channel from an electronic program guide (EPG) stored in advance; and transmitting the detected information on the preference channel to terminals in the phone book group in realtime

7 Claims, 4 Drawing Sheets

ENVIRONMENT SET-UP

○ BROADCASTING ENVIRONMENT VIEW

○ RATING SET-UP

⊙ PREFERENCE CHANNEL REGISTRATION

○ RESERVED RECORDING SET-UP

| OK | CANCEL |

FIG.3A

PREFERENCE CHANNEL REGISTRATION

01 MOVIE CHANNEL ☑
02 MUSIC CHANNEL ☐
03 DRAMA CHANNEL ☑
04 SPORTS CHANNEL ☐

| OK | CANCEL |

FIG.3B

RECEIVED MESSAGE

01 MOVIE CHANNEL

PROGRAM NAME : · · · · ·

PROGRAM INFORMATION : · · · · ·

10/14        14:00P

From : 011-123-4567

FIG.4

METHOD OF SHARING PREFERENCE CHANNEL IN DIGITAL BROADCASTING RECEPTION TERMINAL

PRIORITY

This application claims priority under 35 U.S.C. § 119 to an application entitled "Method of Sharing Preference Channel in Digital Broadcasting Reception Terminal" filed in the Korean Intellectual Property Office on Oct. 24, 2005 and assigned Serial No. 2005-100303, the contents of which are incorporated herein by reference.

BACKGROUND OF THE INVENTION

1. Field of the Invention

The present invention relates generally to digital broadcasting, and in particular, to a method of sharing a preference channel in a digital broadcasting reception terminal.

2. Description of the Related Art

Generally, digital broadcasting is a broadcasting service for providing high image quality, high sound quality, and a better service to subscribers by replacing conventional analog broadcasting, and is classified into satellite digital broadcasting and terrestrial digital broadcasting.

The Satellite digital broadcasting has a main target of a mobile service and allows the subscribers to watch multi-channel multimedia broadcasting every time everywhere using a portable receiver (a mobile telephone or a personal digital assistant (PDA)) or a car receiver.

The Terrestrial digital broadcasting derives from digital audio broadcasting (DAB), and provides multimedia broadcasting for mobile reception using a currently unused VHF channel No. 12, and compositely transmits TV broadcasting, radio broadcasting, and data broadcasting using multi channels. While each of existing terrestrial broadcasters operates a single analog channel, each of digital broadcasters can operate a plurality of digital channels. Such services using multi channels are called "Ensembles".

Recently, accompanying the development of digital broadcasting technology and mobile communication technology, people have been greatly interested in a digital broadcasting service to watch digital broadcasting even while moving. In particular, people have been greatly interested in a digital multimedia broadcasting (DMB) service using a mobile terminal.

Recently, people have began to gather and form a club or community sharing the same hobby or taste in sport, movie, drama, or music. Members of such a club or community gather to enjoy these things together.

Furthermore, when a preferable broadcasting program is broadcasted while anyone of the members is watching digital broadcasting at home, the member may contact the other members to inform the other members of a broadcasting channel of the preferable broadcasting program so that the other members can watch the preferable broadcasting program together.

However, to enable the other members of the same club or community watch a broadcasting program of a preference channel together, a subscriber must make phone calls to the other members of the same community one by one, and it is bothersome for the other members to seek the preference channel.

SUMMARY OF THE INVENTION

An object of the present invention is to substantially solve at least the above problems and/or disadvantages and to provide at least the advantages below. Accordingly, an object of the present invention is to provide a method of sharing a preference channel in a digital broadcasting reception terminal, by which members having similar tastes can easily watch a broadcasting program on a preferred channel.

According to one aspect of the present invention, there is provided a method of sharing a preference channel in a digital broadcasting reception terminal, the method including registering a phone book group to which at least one preference channel and information on the preference channel are transmitted; if digital broadcasting data of the registered preference channel is received, detecting information on the preference channel from an electronic program guide (EPG) stored in advance; and transmitting the detected information on the preference channel to terminals in the phone book group in realtime.

BRIEF DESCRIPTION OF THE DRAWINGS

The above and other objects, features and advantages of the present invention will become more apparent from the following detailed description when taken in conjunction with the accompanying drawings in which:

FIGS. 3A and 3B illustrate menu for screens registering a preference channel in the digital broadcasting reception terminal according to the present invention; and FIG. 4 illustrates a screen of a terminal, which has received a short message transmitted by the digital broadcasting reception terminal according to the present invention.

DETAILED DESCRIPTION OF THE PREFERRED EMBODIMENT

Figure 1:
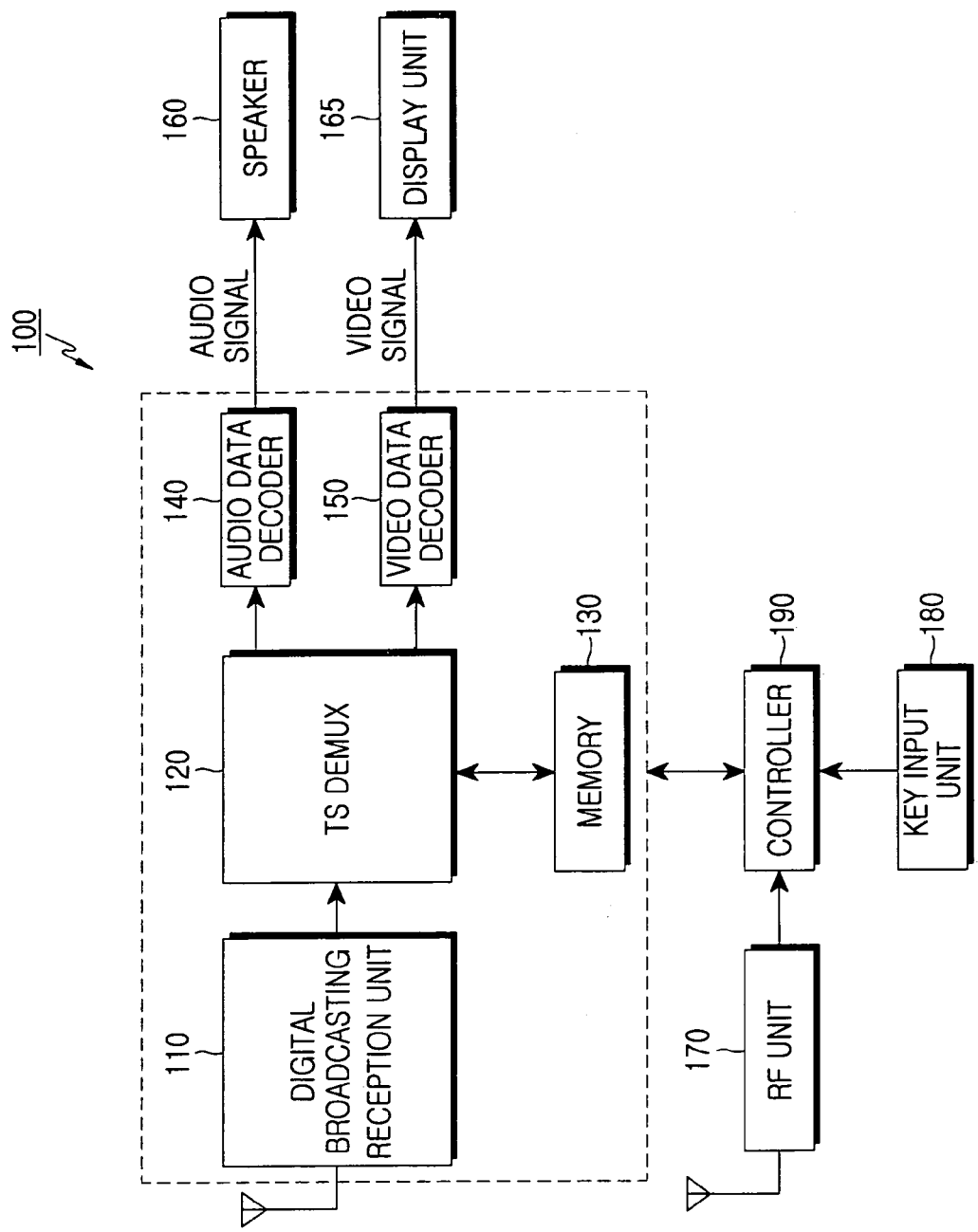
FIG. 1 is a block diagram of a digital broadcasting reception terminal according to of the present invention.

Preferred embodiments of the present invention will be described herein below with reference to the accompanying drawings. In the drawings, the same or similar elements are denoted by the same reference numerals even though they are depicted in different drawings. In the following description, well-known functions or constructions are not described in detail since they would obscure the invention in unnecessary detail.

FIG. 1 is a block diagram of a digital broadcasting reception terminal 100 according to a preferred embodiment of the present invention.

Referring to FIG. 1, the digital broadcasting reception terminal 100 includes a digital broadcasting reception unit 110, a transport stream (TS) demultiplexer 120, a memory 130, an audio data decoder 140, a video data decoder 150, a speaker 160, a display unit 165, a radio frequency (RF) unit 170, a key input unit 180, and a controller 190.

The controller 190 controls the digital broadcasting reception unit 110 to receive digital broadcasting data of a predetermined channel, demodulate the received digital broadcasting data to a digital data stream, and transmit the demodulated digital data stream to the TS demultiplexer 120. The predetermined channel indicates a channel selected by a user. The digital broadcasting reception unit 110 may include a demodulator (not shown) demodulating digital broadcasting data to a digital data stream.

The TS demultiplexer 120 receives the digital data stream from the digital broadcasting reception unit 110 and divides the received digital data stream into an audio data stream and a video data stream by demultiplexing the received digital data stream.

The memory 130 stores various kinds of information required to control an operation of the digital broadcasting reception terminal 100 according to the present invention. The memory 130 also receives an electronic program guide (EPG) including information on digital broadcasting programs via the digital broadcasting reception unit 110 and stores the received EPG.

The audio data decoder 140 receives the audio data stream from the TS demultiplexer 120, decodes the received audio data stream to an analog audio signal, and outputs the decoded analog audio signal to the speaker 160.

The video data decoder 150 receives the video data stream from the TS demultiplexer 120, decodes the received video data stream to an analog video signal, and outputs the decoded analog video signal to the display unit 165. The speaker 160 and the display unit 165 form an output unit in the digital broadcasting reception terminal 100.

The display unit 165 outputs various kinds of display data generated by the digital broadcasting reception terminal 100, and it is preferred that the display unit 165 includes a liquid crystal display (LCD) sufficiently supporting a resolution of the digital broadcasting data. If the LCD is implemented in a touch screen method, the display unit 165 may also operate as an input unit.

The controller 190 controls the RF unit 170 to transmit/receive voice data, character data, image data, and control data. To do this, the RF unit 170 includes an RF transmitter (not shown) up-converting a frequency of a signal to be transmitted and amplifying the frequency up-converted signal, and an RF receiver (not shown) low noise amplifying a received signal and down-converting a frequency of the low noise amplified signal. The RF unit 170 may include a modem (not shown) including a transmitter (not shown) encoding and modulating a signal to be transmitted and a receiver (not shown) decoding and demodulating a received signal.

The key input unit 180 receives a user operational signal, such as a key input or a voice input, and transmits the received user operational signal to the controller 190. The key input unit 180 may include a key for registering a preference channel.

The controller 190 controls a general operation of the digital broadcasting reception terminal 100 according to the present invention. The controller 190 also registers a phone book group, which shares at least one preference channel and information on the preference channel, according to a user's request. The registered information is stored in the memory 130. The phone book group includes telephone numbers and user names of a plurality of terminals, which are input by the user.

When a digital broadcasting reception request is input by the user, the controller 190 switches an operation mode of the digital broadcasting reception terminal 100 to a digital broadcasting mode. If digital broadcasting data of the registered preference channel is received, the controller 190 detects the information on the preference channel from the EPG stored in the memory 130. The information on the preference channel includes at least a channel number, a channel name, a broadcasting program name, and broadcasting program information. After detecting the information on the preference channel, the controller 190 controls the RF unit 170 to transmit the information on the preference channel to the terminals of the phone book group.

Figure 2:
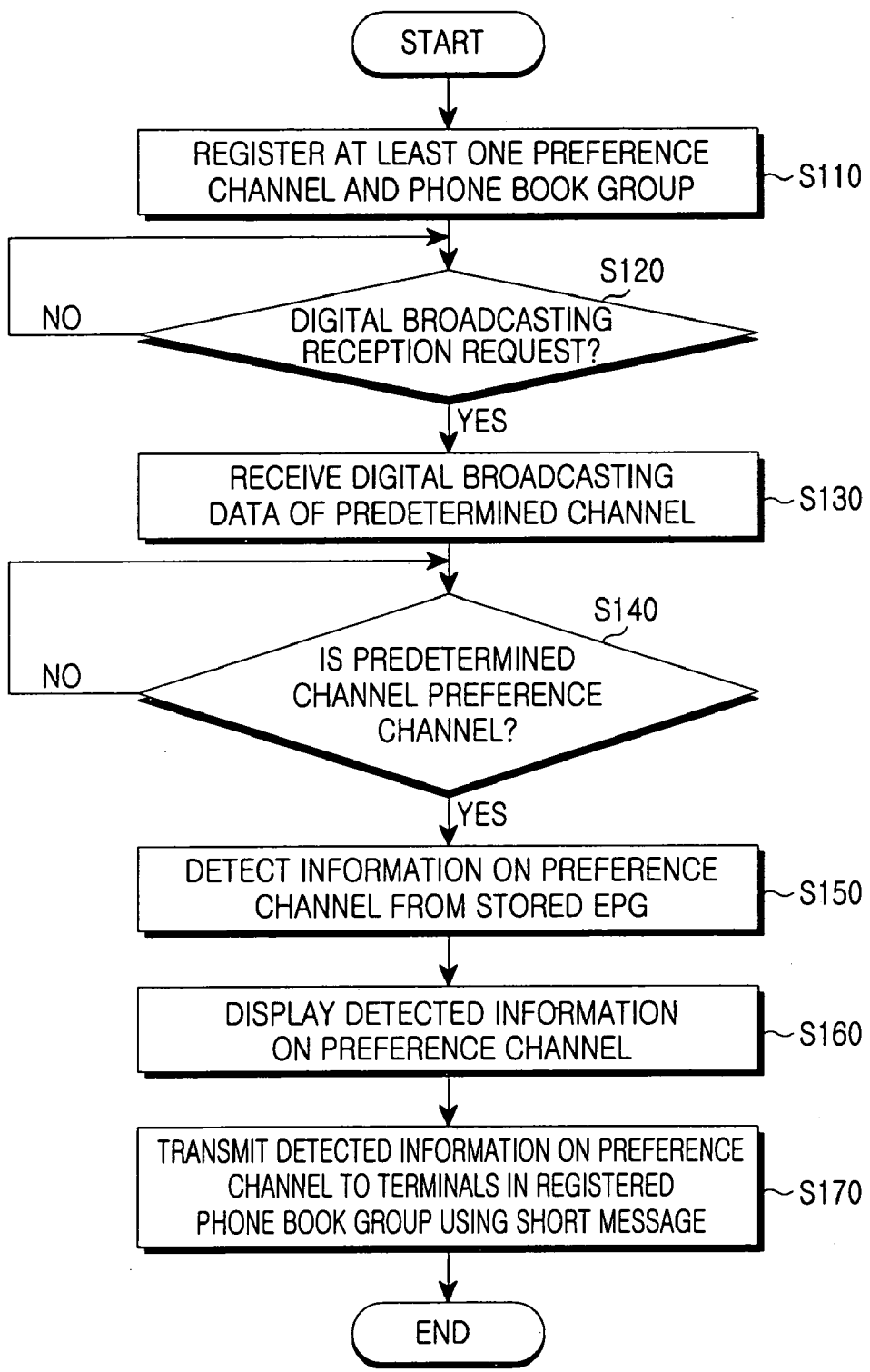
FIG. 2 is a flowchart of a method of sharing a preference channel in a digital broadcasting reception terminal, according to the present invention.

FIG. 2 is a flowchart of an operation of the digital broadcasting reception terminal 100, according to of the present invention.

Referring to FIGS. 1 and 2, the controller 190 registers a phone book group, which shares at least one preference channel and information on the preference channel, according to a user's request in step S110. Telephone numbers and user names of a plurality of terminals, which are input by the user, are stored in the phone book group. The user can register a preference channel by selecting at least one of channels generated from the EPG and displayed by the controller 190 through the screens illustrated in FIGS. 3A and 3B.

FIGS. 3A and 3B illustrate menus screens for registering a preference channel in the digital broadcasting reception terminal 100 according to the present invention. Referring to FIG. 3A, the controller 190 provides a menu screen for the preference channel registration as a type of the menu related to the digital broadcasting. If the user selects a preference channel registration item from the menu screen, the controller 190 displays a screen illustrated in FIG. 3B.

Referring to FIG. 3B, the controller 190 detects all digital broadcasting channels through which a broadcasting service can be provided from the EPG and displays the detected digital broadcasting channels, and then the user can select a desired channel as a preference channel. The controller 190 registers channels selected by the user as preference channels. In the screen illustrated in FIG. 3B, "01 movie channel" and "03 drama channel" are selected as preference channels to be registered by the user. The controller 190 may register a preference channel by the user inputting desired information (e.g., a channel number or name) for the preference channel registration in a type of a key word.

When the registration procedure is finished, the controller 190 determines in step S120 whether a digital broadcasting reception request is input by the user. If the digital broadcasting reception request is input by the user, the controller 190 receives digital broadcasting data of a channel selected by the user through the digital broadcasting reception unit 110 and outputs the received digital broadcasting data to the speaker 160 and the display unit 165, in step S130.

In step S140, the controller 190 determines whether the channel of the digital broadcasting data received through the digital broadcasting reception unit 110 is one of the registered preference channels.

If the channel of the received digital broadcasting data is one of the registered preference channels, the controller 190 detects information on the preference channel from the EPG stored in the memory 130 in step S150. The information on the preference channel includes for example, a channel number, a channel name, a broadcasting program name, and broadcasting program information. The broadcasting program information, for example, can contain a broadcasting start time, a broadcasting end time, main characters, a director, and the rating of a relevant program.

This process may further include the step of the controller 190 determining whether the EPG stored in the memory 130 is updated data before detecting the information on the preference channel. In this case, if the EPG stored in the memory 130 is not updated data, it is preferred that the controller 190 updates the EPG.

When the controller 190 detects the information on the preference channel, among tables included in the EPG, i.e., a network information table (NIT), a broadcaster information table (BIT), a service description table (SDT), and an event information table (EIT), it is preferred that the controller 190 uses the EIT.

The NIT includes information regarding acting satellites and network names, and the BIT is used to transmit information on broadcasting stations. The information on broadcasting stations contains notifications, station names, and current channel lists. The SDT is used to transmit channel information and includes information indicating broadcasting channel names, commissioning broadcaster names, uniform resource locator (URL) information on channels, and channel types. The EIT indicates information on each program, which contains a channel number, a program name, program URL information, program start time information, and a schematic description of the program.

Thus, it is preferred that the controller 190 uses the EIT to detect the information on the preference channel containing a channel number, a channel name, a broadcasting program name, and broadcasting program information.

In step S160, the controller 190 displays the detected information on the preference channel on the display unit 165. When displaying the detected information on the preference channel, it is preferred that the controller 190 displays the detected information on the preference channel on a predetermined location of the screen of the display unit 165 in one of an on-screen-display method and a picture-in-picture method.

In step S170, the controller 190 transmits the detected information on the preference channel to terminals in the registered phone book group in realtime. When transmitting the detected information on the preference channel, it is preferred that the controller 190 transmits the detected information on the preference channel in a short message method. However, if e-mail addresses are included in the registered phone book group, the controller 190 may transmit the detected information on the preference channel using e-mail.

A screen of a terminal, which has received a short message transmitted through the RF unit 170 by the controller 190, may be display the short message as illustrated in FIG. 4. Referring to FIG. 4, the received message includes the information on the preference channel illustrated in FIG. 3, which is transmitted by the digital broadcasting reception terminal 100, i.e., the channel number, the channel name, the broadcasting program name, and the broadcasting program information.

Thus, users of terminals, which have received the short message, can immediately recognize the information on the preference channel transmitted by the sender terminal and readily watch the relevant digital broadcasting.

As described above, according to the present invention, by transmitting information on a preference channel to members registered in a phone book group in realtime when broadcasting corresponding to preference channels registered by a user is received, the preference channel can be shared. Thus, members having similar tastes can easily watch a broadcasting program on the preference channel together.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of sharing a preference channel in a digital broadcasting reception terminal, the method comprising the steps of:
   registering a phone book group to which at least one preference channel and information on the preference channel are transmitted;
   if digital broadcasting data of the registered preference channel is received, detecting information on the preference channel from an electronic program guide (EPG) stored in advance; and
   transmitting the detected information on the preference channel to terminals in the phone book group in realtime.

2. The method of claim 1, wherein phone numbers and user names of a plurality of terminals, which are input by a user, are registered in the phone book group.

3. The method of claim 1, wherein the information on the preference channel contains a channel number, a channel name, a broadcasting program name, and broadcasting program information.

4. The method of claim 1, wherein the step of detecting comprises displaying the detected information on the preference channel.

5. The method of claim 1, wherein the step of detecting comprises:
   determining whether the EPG is updated data before detecting the information on the preference channel; and
   if the EPG is not updated data, updating the EPG.

6. The method of claim 1, wherein the detected information on the preference channel is transmitted to the terminals in the phone book group using a short message.

7. The method of claim 4, wherein the step of detecting comprises
   determining whether the EPG is updated before detecting the information on the preference channel; and
   if the EPG is not updated data, updating the EPG.

* * * * *